United States Patent

[11] 3,602,378

| [72] | Inventor | James K. Thompson<br>Kansas City, Mo. |
|---|---|---|
| [21] | Appl. No. | 875,170 |
| [22] | Filed | Nov. 10, 1969 |
| [45] | Patented | Aug. 31, 1971 |
| [73] | Assignee | Phillips Petroleum Company |

[54] ARTICLE FEEDING APPARATUS
7 Claims, 4 Drawing Figs.

[52] U.S. Cl. .................................................. 214/8.5 A,
214/8.5 F, 221/270
[51] Int. Cl. .................................................. B65g 59/06
[50] Field of Search ....................................... 214/8.5 A,
8.5 F, 8.5 R; 221/270

[56] References Cited
UNITED STATES PATENTS
2,539,652  1/1951  Amberg ........................ 214/8.5 F X
FOREIGN PATENTS
28,133  6/1956  Finland ........................ 214/8.5 F Primary Examiner—Gerald M. Forlenza
Assistant Examiner—George F. Abraham
Attorney—Young and Quigg

ABSTRACT: An apparatus having a movable shuttle with a movable slicing block and separating means for separately and individually removing an article from an article stack.

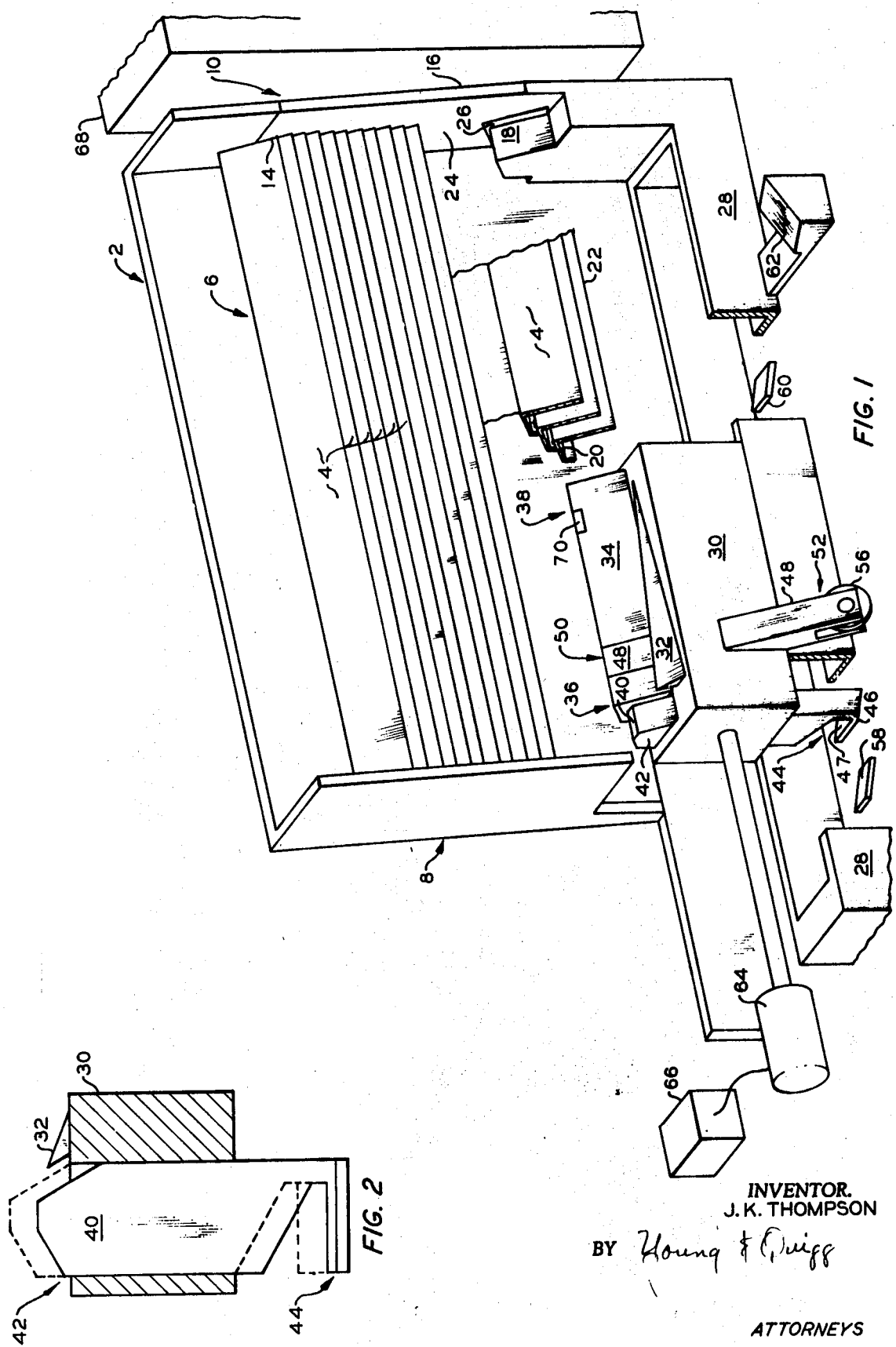
INVENTOR.
J. K. THOMPSON
BY Young & Quigg
ATTORNEYS

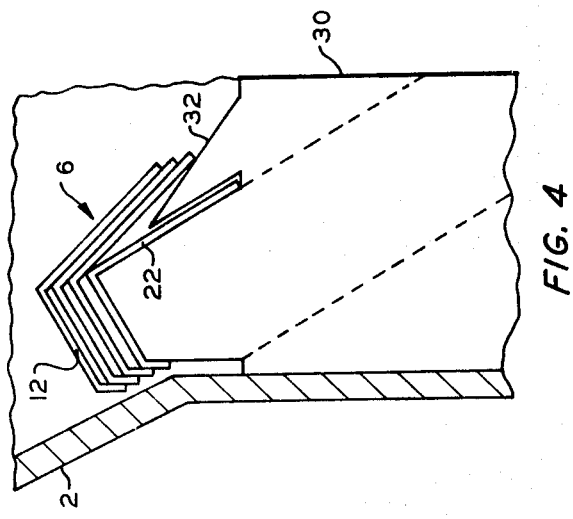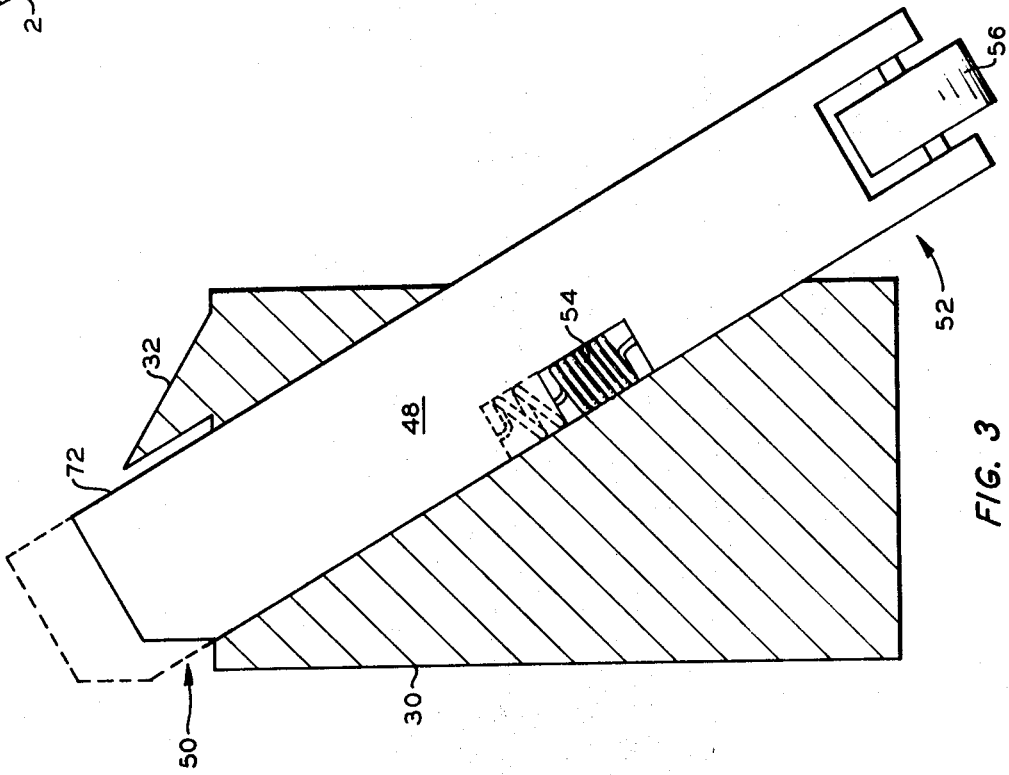

ARTICLE FEEDING APPARATUS

This invention relates to an apparatus for separately and individually removing an article from an article stack. In another aspect, this invention relates to an apparatus for separately and individually removing an article from an article stack and delivering said article to an associated machine at a preselected time.

In manufacturing, it is often required to deliver an article to an associated machine at a particular moment. Sometimes it is also necessary to remove an individual article from an article reservoir and deliver said article to the associated machine in a particular position relative to that machine.

It is therefore an object of this invention to provide an apparatus for removing an article from a plurality of articles and delivering said article to an associated manufacturing machine. Another object of this invention is to provide an apparatus for delivering an individual article to an associated machine at a desired time and in a particular position relative to said machine. Yet another object of this invention is to provide an apparatus of the above-described type that has relatively few moving parts, is simple to operate and functions automatically. Other aspects, objects, and advantages of the present invention will become apparent from a study of the disclosure, the appended claims, and the drawing.

In the drawings, FIG. 1 is an axonometric view of the apparatus of this invention, FIGS. 2 and 3 are sectional views of the shuttle, and FIG. 4 is a diagrammatic view of an article stack resting upon the shuttle.

Referring to FIG. 1, an article reservoir 2 contains a plurality of elongated articles 4 positioned one on top of the other to form an article stack 6. The reservoir 2 has a first end portion 8 and a second end portion 10 with a first end 12 of each article 4 positioned adjacent the first end portion 8 of the reservoir 2 and a second end 14 of each article 4 positioned adjacent the second end portion 10 of the reservoir 2. An article gate 16 is positioned adjacent the second end portion 10 of the reservoir 2. A gate 16 has a supporting member 18 for contacting and supporting a portion of a lower surface 20 of the lowermost article 22 of the article stack 6 within the reservoir 2, and a stopping element 24 extending upwardly from the supporting member 18 engaging the second end portion 10 of the reservoir 2. A gate opening 26 is formed through the stopping element 24 of the gate 16 for passing the lowermost article from the reservoir while maintaining the remainder of the article stack 6 within the reservoir 2.

A track 28 is positioned adjacent and at a lower elevation than the reservoir 2 and extends between the first and second end portions 8,10 of said reservoir 2. A shuttle 30 is positioned on the track 28 and is movable thereupon between a first position at which the shuttle 30 is adjacent the first end portion 8 of the reservoir 2 and a second position at which the shuttle 30 is adjacent the second end portion 10 of the reservoir 2.

The shuttle 30 has a separating element 32 mounted on an upper surface 34 of the shuttle 30 extending between the first and second end portions 36,38 of said shuttle 30. FIG. 4 shows the article stack 6 resting on the shuttle 30 with the separating element 32 extending between and separating the lowermost article 22 from the remainder of the article stack 6. A slicer block 40 having first and second end portions 42,44 is movably mounted on the shuttle 30 for movement relative to the shuttle 30 between a first position, shown by broken lines in FIG. 2, at which the first end portion 42 of the block 40 is adjacent the first end 12 of only the lowermost article 22 in the reservoir 2 and a second position, shown by solid lines in FIG. 2, at which the first end portion 42 of the block is at a lower elevation than the lowermost article 22 in the reservoir 2. The second and portion 44 of the block 40 has cam surfaces 46 and 47 formed thereon.

A stack lifter 48 is also movably mounted on the shuttle 30. The lifter 48 has first and second end portions 50,52 and is movable relative to the shuttle 30 between a first position, shown by solid lines in FIG. 3, at which the first end portion 50 of the lifter 48 is at a lower elevation than the lowermost article 22 in the reservoir 2 and a second position, shown by broken lines in FIG. 3, at which the first end portion 50 of the lifter 48 is extended relative to the shuttle 30, in contact with the lowermost article 22 in the reservoir 2 and has moved the article stack 6 upwardly a distance sufficient to position a portion of the lowermost article 22 at a higher elevation than the separating element 32. A biasing means 54, such as a helical spring for example, is attached to the lifter 48 and the shuttle and urges the lifter 48 toward the first position. A cam surface 56 is formed on the second end portion 52 of the lifter 48.

For simplicity of operation and construction, it is preferred that the shuttle 30 have a pair of separate openings extending therethrough for mounting the slicer block 40 and stack lifter 48 therethrough and thereupon.

A first cam 58 is positioned in the pathway of the second end portion 44 of the slicer block 40 at the first position of the shuttle 30 for contacting the cam surface 46 of the block 40 and moving the block 40 from the second to the first position in response to movement of the shuttle 30 from the second to the first position. A second cam 60 is positioned in the pathway of the second end portion 44 of the slicer block 40 at the second position of the shuttle 30 for contacting the cam surface 47 of the block 40 and moving the block 40 from the first to the second position in response to movement of the shuttle 30 from the first to the second position. A third cam 62 is positioned in the pathway of the second end portion 52 of the stack lifter 48 of the shuttle 30 at the second position of the shuttle 30 for contacting the cam surface 56 of the lifter 48 and moving the lifter 48 from the first to the second position in response to movement of the shuttle 30 from the first to the second position.

A power means 64 is attached to the shuttle 30 for moving the shuttle between the first and second positions. For simplicity of construction and operation it is preferred that the power means be a pneumatic cylinder. A controlling means 66 is preferably attached to the cylinder for interrupting movement of the shuttle 30 from the first toward the second position and, upon receiving a signal from the associated machinery 68, causing the power means 64 to drive the shuttle 30 to the second position. By so constructing the power means 64 with a controlling means 66, the shuttle 30 can be moved to position an article relative to associated machinery 68 and then stopped and, after receiving a signal from the associated machinery, move the article 4 to a position where the machinery engages and removes the article 4 from the gate 16. The shuttle 30 continues its movement to the second position, back to the first, then to the intermediate position where it stops again to await the signal from the associated machine. Where the associated machinery 68 requires the article 4 to be driven into the strip removing mechanism of machine 68 directly from the first shuttle position without the intermediate stop, the controlling means 66 can be eliminated and the power source constructed to uninterruptingly drive the shuttle 30 from the first to the second position then back to the first where it stops. The controlling means for intermittently interrupting movement of the article toward the associated machine 68 and positioning said article relative to said machine 68 for subsequent movement into and extraction by the machine 68 can be, for example, two pneumatic valves actuated by the shuttle and a solenoid operated air valve actuated by the associated machine. As the shuttle moves from the first to the second position it engages a spring return two-way valve to interrupt the air supply to the single acting air cylinder thereby stopping its motion. On signal from the associated machine, a two-way solenoid valve in parallel with the spring return valve supplies air to continue the motion of air cylinder which reestablishes the air supply to the cylinder through the spring return valve when the shuttle moves past the spring return valve and its spring returns to its initial position. As the shuttle reaches the second position, it engages the three-way cylinder supply valve operating lever thereby cutting off the air supply line and venting the air cylinder. The air cylinder spring returns the shuttle to position one and strikes the operating lever of the three-way cylinder supply valve to reestablish the air supply to the cylinder and close the vent line thereby moving the shuttle toward the second position.

In order to maintain an article against lateral movement which causes binding or damage to the shuttle and the article, it is preferred that the upper surface 34 of the shuttle 30 has a configuration substantially the same as the lower surface 20 of the elongated article 4. In order to maintain the lowermost article 22 in contact with the upper surface 34 of the shuttle, in cases where there are few articles 4 of a magnetic material in the article stack 6, it is preferred that a magnet 70 be mounted on the upper surface 34 of the shuttle 30. Where there are numerous articles in the article stack 6 above the lowermost article 22, said lowermost article 22 is held in contact with the upper surface 34 of the shuttle 30 and in a position to enter the opening 26 of the gate 16 by the weight of the article stack 6. Absent this weight, the article can flex upwardly, not enter the gate opening 26 during movement of the shuttle 30 and be damaged and interrupt the feeding operation of the apparatus. The magnet 70, however, maintains the lowermost article 22 in contact with the upper surface 34 and correctly positioned adjacent the gate opening 26.

FIG. 4 shows an article stack 6 with the lowermost article 22 contacting the upper surface 34 of the shuttle 30 and with portions thereof separated from the other articles 4 of the stack 6 by the separating element 32.

In the operation of the apparatus of this invention, a plurality of articles 4 are stacked within the reservoir 2 one on the other to form an article stack 6 having the lower surface 20 of each article directed downwardly and the lower surface 20 of the lowermost article 22 resting upon the upper surface 34 of the shuttle 30. At the first position of the shuttle the slicer block 40 is at the first position in contact with the first end 12 of only the lowermost article 22. The power means 30–64 moves the shuttle toward the second position of the shuttle 30 thereby moving only the lowermost article 22 by the slicer block 40 through the gate opening 26 and to the associated machine 68.

At the second position of the shuttle 30, the second cam 60 contacts the second end portion 44 of the slicer block 40 and moves said block downwardly from the first to the second position. At the second position of the shuttle, the second end portion 52 of the stack lifter 48 contacts the third cam 62 and is moved from the first to the second position. At the second position of the stack lifter 48 the lowermost article 22 of the article stack 6 is raised to a higher elevation than the separating element 32. As the lowermost article 22 passes the separating element 32, said article 22 moves by gravity into contact with a side 72 of the lifter 48. As the shuttle 30 moves from the second to the first position, the spring 54 returns the stack lifter 48 to the first position. As the article stack 6 moves downwardly in response to movement of the stack lifter 48, the separating element 32 is forced between the lowermost article 22 and the remainder of the articles 4 within the reservoir 2. The separating element 32 thereby causes the remainder of the stack 6 to be positioned at a different attitude than the lowermost article 22. By so positioning the lowermost article 22 relative to the next higher contacting article, the frictional force between the two during movement of the lowermost article 22 by the shuttle 30 is reduced. Reducing this frictional force from the lowermost article 22 to be removed more smoothly and with reduced power requirements.

The power means 64 moves the shuttle 30 to the first position at which the first cam 58 contacts the second end portion 42 of the slicer block 40 causing said block to move from the second to the first position. At the first position of the slicer block 40 and the shuttle 30, a new cycle of operation is initiated.

It should be understood that the upper surface 34 of the shuttle 30, the first end portion 42 of the slicer block 40, and the first end portion 50 of the stack lifter 48 can be of other configurations so as to function properly on articles having a different shape. It is important, however, to have the upper surface of these elements conform to the shape of the article to prevent tilting of the article relative to the opening 26 of the gate 16. By changing the gate opening 26, slicer block 40, shuttle upper surface 34 and stack lifter 48, this apparatus can be readily adapted to function properly on elongated articles of different configuration.

Other modifications and alterations of this invention will become apparent to those skilled in the art from the foregoing discussion and accompanying drawing, and it should be understood that this invention is not to be unduly limited thereto.

What is claimed is:

1. An apparatus having an article reservoir for separately and individually removing an elongated article from an article stack positioned within the reservoir at preselected intervals, comprising:
   a shuttle in contact with and movable relative to articles stacked within the reservoir;
   power means for moving the shuttle between a first position adjacent a first end portion of the reservoir and a second position adjacent a second end portion of the reservoir;
   a separating element fixedly attached to an upper surface of the carriage and extending upwardly therefrom with an end of said element extending between and separating portions of a first article from an adjacent second article of the article stack in the first position of the shuttle;
   a slicer block having first and second end portions and being movably mounted on the shuttle for movement between a first position at which the first end portion of the block is adjacent an end of only the lowermost article in the reservoir and a second position at which the first end portion of the block is at a lower elevation than the lowermost article in the reservoir;
   a stack lifter having first and second end portions and being movably mounted on the shuttle for movement between a first position at which the first end portion of the lifter is at a lower elevation than the lowermost article in the reservoir and a second position at which the first end portion of the lifter is extended relative to the shuttle for contacting the lowermost article in the reservoir and moving the article stack upwardly a distance sufficient to position a portion of the lowermost article of the article stack at a higher elevation than the separating element;
   means for moving the slicer block to the first position at the first position of the shuttle;
   means for moving the slicer block to the second position at the second position of the shuttle;
   means urging the stack lifter to the first position; and
   means for moving the stack lifter to the second position at the second position of the shuttle.

2. An apparatus, as set forth in claim 1, including an article gate having an opening positioned adjacent the second end portion of the reservoir and constructed to maintain a portion of the articles within the reservoir while passing the lowermost article from the reservoir in response to movement of the shuttle from the first toward the second position.

3. An apparatus, as set forth in claim 1, including controlling means for interrupting the shuttle moving between the first toward the second position.

4. An apparatus, as set forth in claim 1, wherein the means for moving the slicer block from the first to the second position is a first cam positioned adjacent the slicer block at the second position of the shuttle in the pathway of the second end portion of the block and the means for moving the slicer block from the second to the first position is a second cam positioned adjacent the slicer block at the first position of the shuttle in the pathway of the second end portion of the block.

5. An apparatus, as set forth in claim 1, wherein the means for moving the stack lifter from the first to the second position is a third cam positioned adjacent the stack lifter at the second position of the shuttle in the pathway of the second end portion of the stack lifter and the means for moving the stack lifter from the second to the first position is a biasing means.

6. An apparatus, as set forth in claim 1, including a magnet mounted on an upper surface of the shuttle for urging the lowermost article into forceful contact with the shuttle.

7. An apparatus, as set forth in claim 6, wherein the upper surface of the shuttle has a configuration substantially the same as the lower surface of the elongated articles.